United States Patent
Rocher et al.

(10) Patent No.: US 9,021,075 B2
(45) Date of Patent: Apr. 28, 2015

(54) SYSTEM FOR MANAGING WAKEUP AND SLEEP EVENTS OF COMPUTERS CONNECTED TO A MOTOR VEHICLE CAN NETWORK

(75) Inventors: Jean-Michel Rocher, Nozay (FR); Jean-Yves Stineau, Montigny-le-Bretonneux (FR)

(73) Assignee: Renault S.A.S., Boulogne-Billancourt (FR)

( * ) Notice: Subject to any disclaimer, the term of this patent is extended or adjusted under 35 U.S.C. 154(b) by 643 days.

(21) Appl. No.: 13/140,519

(22) PCT Filed: Oct. 22, 2009

(86) PCT No.: PCT/FR2009/052032
§ 371 (c)(1),
(2), (4) Date: Oct. 21, 2011

(87) PCT Pub. No.: WO2010/070218
PCT Pub. Date: Jun. 24, 2010

(65) Prior Publication Data
US 2012/0030330 A1 Feb. 2, 2012

(30) Foreign Application Priority Data
Dec. 18, 2008 (FR) ...................................... 08 58753

(51) Int. Cl.
| | |
|---|---|
| G06F 15/173 | (2006.01) |
| G06F 7/00 | (2006.01) |
| G05D 1/00 | (2006.01) |
| G05D 3/00 | (2006.01) |

(Continued)

(52) U.S. Cl.
CPC . *H04L 12/40039* (2013.01); *H04L 2012/40215* (2013.01); *H04L 2012/40273* (2013.01)

(58) Field of Classification Search
CPC ........... H04L 2012/40215; H04L 2012/40267; H04L 2012/40273
USPC .......................... 709/223; 370/401; 701/1, 36
See application file for complete search history.

(56) References Cited

U.S. PATENT DOCUMENTS

| | | | | |
|---|---|---|---|---|
| 6,484,082 | B1* | 11/2002 | Millsap et al. | 701/48 |
| 6,871,250 | B2* | 3/2005 | Froeschl et al. | 710/110 |
| 7,210,049 | B2* | 4/2007 | Disser | 713/324 |

(Continued)

FOREIGN PATENT DOCUMENTS

EP 1 158 718 11/2001

OTHER PUBLICATIONS

International Search Report Issued Jan. 29, 2010 in PCT/FR09/052032 filed Oct. 22, 2009.

*Primary Examiner* — Douglas Blair
(74) *Attorney, Agent, or Firm* — Oblon, McClelland, Maier & Neustadt, L.L.P.

(57) ABSTRACT

A system for managing wakeup and sleep events of computers connected to a motor vehicle secondary CAN network, the secondary CAN network being connected to a main CAN network by a gateway. The system includes a master computer connected to the main CAN network and configured to manage the wakeup and sleep events of the computers through the exchange therewith of wakeup and sleep frames via the gateway. The gateway can: synthesize a single wakeup and sleep frame based on plural wakeup and sleep frames emitted by the computers, and emit the single frame to the master computer that is configured to interpret the frame.

5 Claims, 1 Drawing Sheet

(51) Int. Cl.
*G06F 17/00* (2006.01)
*H04L 12/40* (2006.01)

(56) References Cited

U.S. PATENT DOCUMENTS

| | | | |
|---|---|---|---|
| 7,457,301 B2* | 11/2008 | Furuta et al. | 370/401 |
| 7,484,008 B1* | 1/2009 | Gelvin et al. | 709/249 |
| 7,539,888 B2* | 5/2009 | Hu et al. | 713/324 |
| 7,783,908 B2* | 8/2010 | Bogovac | 713/323 |
| 8,509,257 B2* | 8/2013 | Yakashiro | 370/421 |
| 2002/0006139 A1* | 1/2002 | Kikkawa et al. | 370/502 |
| 2005/0160301 A1* | 7/2005 | Disser | 713/310 |
| 2006/0013237 A1 | 1/2006 | Furuta et al. | |
| 2007/0088473 A1* | 4/2007 | Moon et al. | 701/36 |
| 2007/0288102 A1* | 12/2007 | Korzin | 700/22 |
| 2008/0037504 A1* | 2/2008 | Jeon et al. | 370/342 |
| 2008/0276107 A1* | 11/2008 | Bogavac | 713/323 |
| 2008/0304499 A1* | 12/2008 | Jeon et al. | 370/401 |
| 2009/0323578 A1* | 12/2009 | Hogenmueller et al. | 370/315 |
| 2010/0031212 A1* | 2/2010 | Dong et al. | 716/8 |
| 2010/0131156 A1* | 5/2010 | Lee | 701/49 |
| 2011/0022266 A1* | 1/2011 | Ippolito et al. | 701/37 |

* cited by examiner

SYSTEM FOR MANAGING WAKEUP AND SLEEP EVENTS OF COMPUTERS CONNECTED TO A MOTOR VEHICLE CAN NETWORK

BACKGROUND

The present invention relates to managing sleep and wakeup events of computers in motor vehicle CAN ("Control Area Network") networks.

As known in itself, in a motor vehicle, many functionalities are controlled electronically with the aid of computers (injection, braking, air-conditioning, windshield wipers, etc.).

For reasons of safety or for reasons of simplicity in design, a motor vehicle is normally equipped with several CAN networks interconnected via gateways.

Furthermore, some computer controlled vehicle functionalities are intermittent, as for example the so-called "comfort" functionalities such as air-conditioning, windscreen wipers, power windows, etc. In order to save energy, when a vehicle functionality is not used, the associated computer sleeps, then wakes up when needed.

The wakeup and sleep commands for the vehicle computers are normally handled centrally by a dedicated computer, called a "master" computer and the CAN network to which it is connected is then designated the "main" CAN network. The other CAN networks of the vehicle are designated as "secondary" networks and the computers under the command of the master computer are termed "slave" computers.

For wakeup and sleep events of a slave computer, the master computer emits a command frame to its address on the main CAN network. Where necessary, the command frame passes through a gateway when the slave computer is connected to a secondary CAN network. Once received by the slave computer, the latter then emits a frame in return to the master computer confirming successful reception of the command frame, a frame that passes through the gateway where necessary.

Given the large number of computers on board the vehicle, the number of frames being carried on the main CAN network is very large. Thus risks of collision are great. The risk of a frame not being immediately taken into account by the master computer is also high when there are a large number of frames. A powerful master computer must therefore be provided in order to minimize such risks.

BRIEF SUMMARY

The purpose of the present invention is to solve the aforementioned problem by providing a system for managing the wakeup and sleep events of slave computers, which significantly reduce the number of frames exchanged with the master computer, thus reducing the risk of frame collision and speeding up frame processing by the master computer.

Accordingly, the object of the invention is a system for managing wakeup and sleep events of computers connected to a motor vehicle secondary CAN network, said secondary CAN network being connected to a main CAN network by means of a gateway, said system comprising a master computer connected to the main CAN network and capable of managing the wakeup and sleep events of the computers through the exchange of wakeup and sleep frames with them via the gateway.

According to the invention, the gateway can synthesize a single wakeup and sleep frame on the basis of several wakeup and sleep frames emitted by the computers and emit this single frame to the master computer which is configured to interpret said frame.

According to a particular embodiment of the invention, the master computer can emit a wakeup and sleep frame relating to several secondary CAN network computers, and the gateway can emit, according to this frame, a wakeup and sleep frame to each computer concerned.

According to a particular embodiment, the gateway is further suited for implementing a degraded sleep mode for computers connected to the main CAN network.

BRIEF DESCRIPTION OF THE DRAWINGS

The invention will be better understood on reading the description that follows, given solely by way of example and by referring to the attached drawings, in which the same references designate the same or similar elements, and in which.

DETAILED DESCRIPTION

Figure 1:
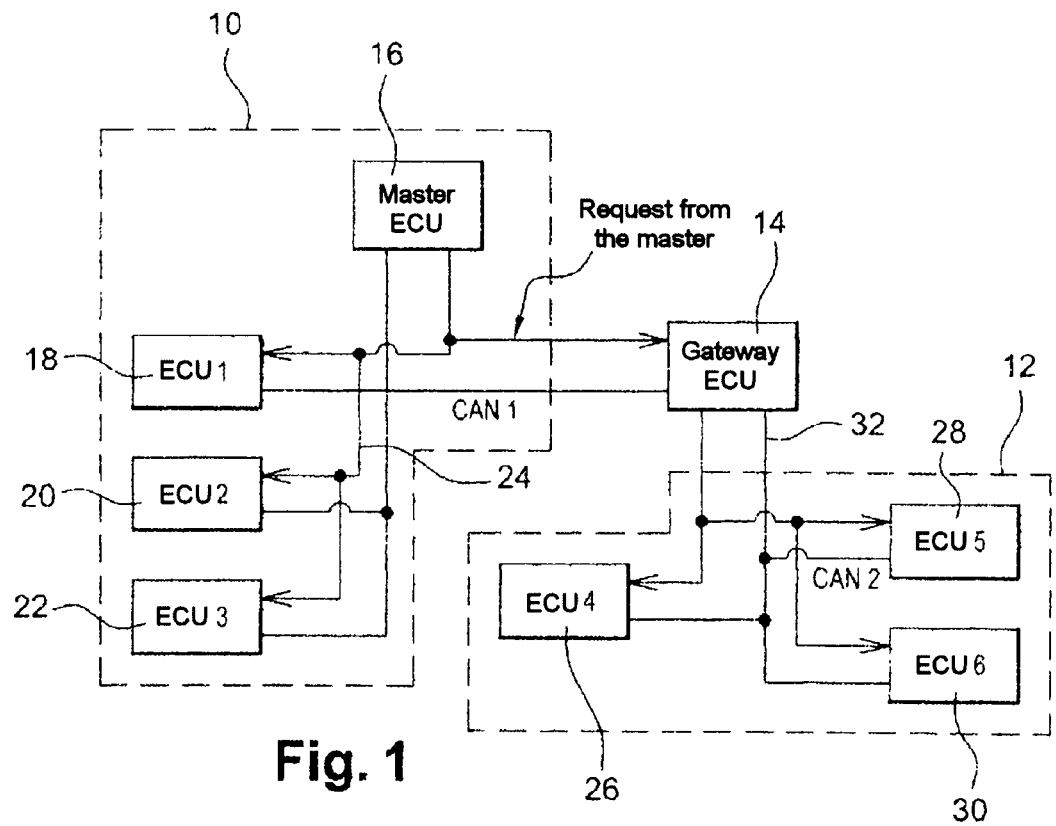
FIG. 1 is a schematic view of command frames emitted by a master computer in a vehicle equipped with main and secondary CAN networks.
Figure 2:
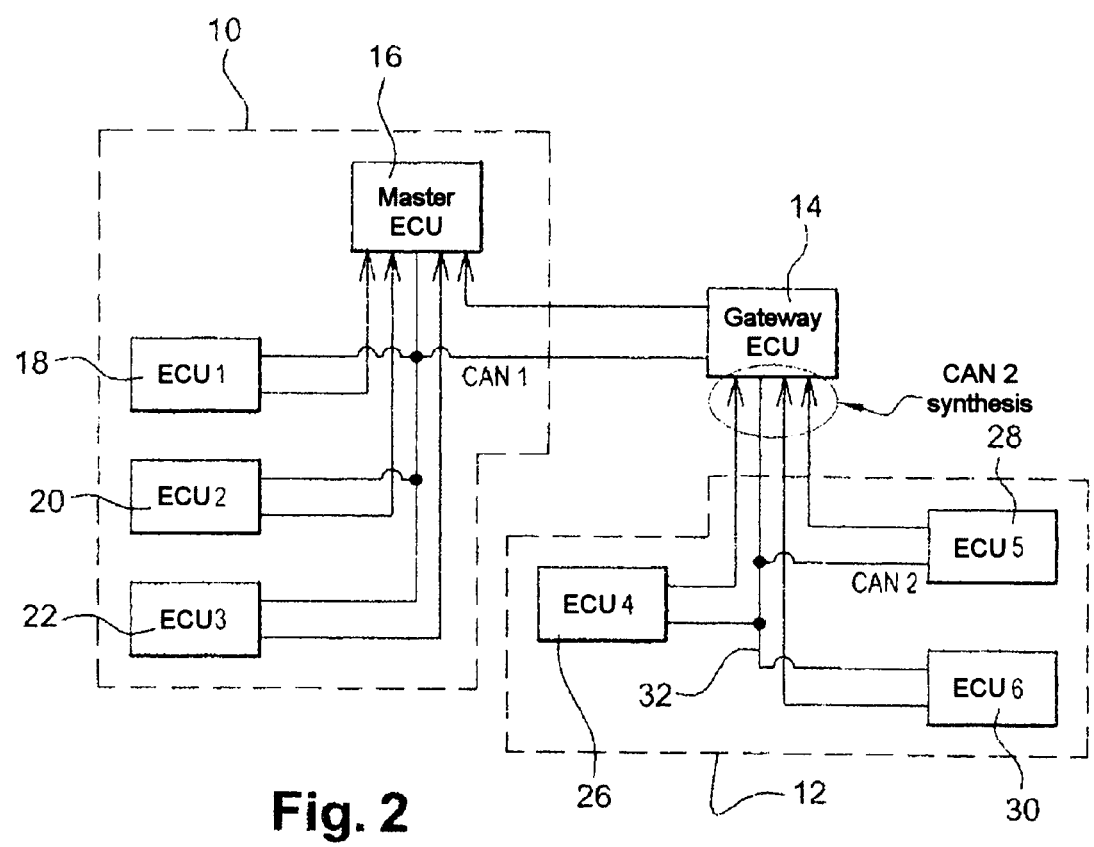
FIG. 2 is a schematic view of frames emitted by the slave computers connected to said CAN networks.

In FIGS. 1 and 2, a motor vehicle main CAN network 10 is connected to a secondary CAN network 12 via a gateway 14.

The main CAN network 10 comprises a master computer 16 and slave computers 20-22 connected to a CAN bus 24. The secondary CAN network 12 comprises slave computers 28-30 connected to a CAN bus 32, the gateway 14 being connected to both CAN bus 24 and to the CAN bus 32.

The master computer 16 manages the wakeup and sleep events of each of the slave computers 18, 20, 22, 26, 28, 30.

The wakeup or sleep of slave computers 18, 20, 22 of the main CAN network 10 is achieved conventionally by the emission of a command frame by the master computer 16 for the attention of each slave computer needing to be woken up or put to sleep (FIG. 1). Each slave computer having received the frame intended for it in its turn then emits a frame confirming successful reception to the master computer 16 (FIG. 2).

According to the invention, the wakeup or sleep of slave computers 26, 28, 30 of the secondary CAN network 12 is on the other hand achieved with the aid of the gateway 14 in order to reduce the number of frames exchanged by the master computer 16 with the secondary network 12.

More particularly, when the wakeup and/or sleep of several slave computers of the secondary CAN network 12 is/are required, the master computer emits a single command frame comprising the addresses and commands for each of the targeted slave computers. The gateway 14 receives said single command frame, extracts the information from it, then emits for the attention of each of the slave computers involved a command frame similar to that which it would have conventionally received from the master computer 16 (FIG. 1).

The frames confirming successful reception are then emitted by the slave computers to the master computer 14. The gateway receives these confirmation frames and on the basis of these creates a single confirmation frame comprising all the information contained in the frames emitted by the slave computers. The gateway 14 emits this single confirmation frame on the main CAN network to master computer 16 which extracts from it the confirmation information emitted by the slave computers (FIG. 2).

For example, the gateway 14 forms a single confirmation frame, on the basis of the frames received from the slave computers 26, 28, 30, this synthesis being capable of being achieved in real time or based on information stored for a predetermined period in a buffer memory of the gateway 14. In this second case, once this period has elapsed, the gateway forms the single confirmation frame on the basis of the stored frames, emits the frame thus formed, deletes the contents of the buffer memory and restarts a new memory storage cycle.

Preferably, the gateway 14 is further suited for implementing a degraded sleep mode for computers connected to the main CAN network. For example, it comprises software components identical to that of the master computer 16 for managing the wakeup and sleep events of the slave computers. The gateway then takes over from the master computer in the event of its failure.

The invention claimed is:

1. A system for managing wakeup and sleep events of slave computers connected to a motor vehicle secondary CAN network, the secondary CAN network being connected to a main CAN network by a gateway, the system comprising:
    a master computer connected to the main CAN network and configured to manage the wakeup and sleep events of the slave computers by exchanging wakeup and sleep frames with the slave computers through the gateway, wherein the master computer is configured to emit a single command frame including wakeup or sleep commands for each of the slave computers and the gateway is configured to receive the single command frame, extract information from the command frame, and emit plural wakeup or sleep frames based on the information extracted from the command frame to the slave computers.

2. The system as claimed in claim 1, wherein the gateway is further configured to implement a degraded sleep mode for slave computers connected to the main CAN network.

3. The system as claimed in claim 1, wherein the gateway is configured to synthesize a single wakeup and sleep frame based on plural wakeup and sleep frames emitted by the slave computers and to emit the single wakeup and sleep frame to the master computer and the master computer is configured to interpret the single wakeup and sleep frame.

4. The system as claimed in claim 3, wherein the gateway is configured to store the plural wakeup and sleep frames emitted by the slave computers for a predetermined period of time in a buffer memory and to emit the single wakeup and sleep frame to the master computer after the predetermined period of time has elapsed.

5. The system as claimed in claim 4, wherein the gateway is configured to delete the contents of the buffer memory after the predetermined period of time has elapsed and restart a new memory storage cycle.

* * * * *